United States Patent
Nakajima et al.

(10) Patent No.: US 9,809,745 B2
(45) Date of Patent: Nov. 7, 2017

(54) PHOSPHOR AND METHOD FOR PRODUCING SAME

(71) Applicant: DAIICHI KIGENSO KAGAKU KOGYO CO., LTD., Osaka-shi, Osaka (JP)

(72) Inventors: Yasushi Nakajima, Osaka (JP); Masayuki Takai, Osaka (JP)

(73) Assignee: DAIICHI KIGENSO KAGAKU KOGYO CO., LTD., Osaka-shi (JP)

(*) Notice: Subject to any disclaimer, the term of this patent is extended or adjusted under 35 U.S.C. 154(b) by 218 days.

(21) Appl. No.: 14/895,248

(22) PCT Filed: May 8, 2014

(86) PCT No.: PCT/JP2014/062337
§ 371 (c)(1),
(2) Date: Dec. 2, 2015

(87) PCT Pub. No.: WO2014/196305
PCT Pub. Date: Dec. 11, 2014

(65) Prior Publication Data
US 2016/0102249 A1    Apr. 14, 2016

(30) Foreign Application Priority Data

Jun. 3, 2013 (JP) ................................. 2013-116851

(51) Int. Cl.
| | | |
|---|---|---|
| *C09K 11/67* | (2006.01) | |
| *C09K 11/70* | (2006.01) | |
| *C09K 11/08* | (2006.01) | |
| *C09K 11/88* | (2006.01) | |

(52) U.S. Cl.
CPC ............ *C09K 11/881* (2013.01); *C09K 11/67* (2013.01); *C09K 11/676* (2013.01); *C09K 11/678* (2013.01); *C09K 11/70* (2013.01); *C09K 11/701* (2013.01)

(58) Field of Classification Search
CPC ......... C09K 11/88; C09K 11/70; C09K 11/67; C09K 11/63; C09K 11/59
See application file for complete search history.

(56) References Cited

U.S. PATENT DOCUMENTS

| | | |
|---|---|---|
| 5,095,218 A | 3/1992 | Bryan et al. |
| 5,306,441 A | 4/1994 | Reddy et al. |
| 2004/0066354 A1 | 4/2004 | Aoki et al. |
| 2008/0199728 A1 | 8/2008 | Kim et al. |
| 2010/0102276 A1 | 4/2010 | Kuze et al. |
| 2012/0026719 A1 | 2/2012 | Sugiyama et al. |

FOREIGN PATENT DOCUMENTS

| | | |
|---|---|---|
| CN | 102517009 A | 6/2012 |
| JP | 2000-80363 A | 3/2000 |
| JP | 2000-516296 A | 12/2000 |
| JP | 2003-82344 A | 3/2003 |
| JP | 2005-48107 A | 2/2005 |
| JP | 2006-233047 A | 9/2006 |
| JP | 2008-69290 A | 3/2008 |
| JP | 2008-202044 A | 9/2008 |
| JP | 2008-222766 A | 9/2008 |
| JP | 2012-52102 A | 3/2012 |
| WO | 98/55562 A1 | 12/1998 |

OTHER PUBLICATIONS

International Search Report dated Jul. 29, 2014, issued in counterpart International Application No. PCT/JP2014/062337 (2 pages).
Shimizu et al., "Preparation and Luminescent Properties of MO2 (M=Zr, Hf) with Baddeleyite Structure", Journal of the Japan Society of Powder and Powder Metallurgy, 1999, pp. 175-179, vol. 46, No. 2.
Akiyama et al., "Intense visible light emission from stress-activated ZrO2: Ti", Applied Physics Letters, Jul. 15, 2002, pp. 457-459, vol. 81, No. 3.
Cong et al., "Long lasting phosphorescent properties of Ti doped ZrO2", Journal of Luminescence, 2007, pp. 322-826, vol. 126.
He, L. et al, "Characterization of the VUV Excitation Spectrum of BaZr(BO3)2: Eu", Journal of Luminescence, Apr. 2007, vol. 126, No. 1, pp. 182-186.
Extended (supplementary) European Search Report dated Oct. 11, 2016, issued in counterpart European Application No. 14807674.8 (7 pages).

*Primary Examiner* — Carol M Koslow
(74) *Attorney, Agent, or Firm* — Westerman, Hattori, Daniels & Adrian, LLP (57) ABSTRACT

The object of the present invention is to provide an oxide-based phosphor comprising elements other than rare earth elements as light-emitting elements, with low material costs, while achieving high luminous efficacy. The means for achieving the object is a phosphor comprising the following (1) to (3): (1) zirconium oxide, (2) titanium, and (3) at least one element selected from the group consisting of phosphorus, selenium, boron, and silicon.

5 Claims, 4 Drawing Sheets

PHOSPHOR AND METHOD FOR PRODUCING SAME

TECHNICAL FIELD

The present invention relates to a zirconium oxide-based phosphor that exhibits fluorescence when excited by light at a predetermined wavelength, and also relates to a method for producing the phosphor. As used in this specification, the term "phosphor" refers to a material for use in applications of photoluminescence (i.e., a visible light emission phenomenon caused by ultraviolet irradiation).

BACKGROUND ART

Phosphors that emit visible light (typically, light with a wavelength of 380 nm or more to less than 830 nm) upon ultraviolet irradiation are used, for example, in display devices, such as lighting systems, televisions, and plasma displays, electronic microscopes, X-ray photography, signs, photovoltaic devices, and biology experiments. For the phosphors, materials containing rare earth elements as light-emitting elements have often been used (e.g., Patent Literature 1 to 3). However, rare earth elements are disadvantageous in that the reserves are small, the countries of production are limited, and the costs for separation and purification are high. Thus, there has been demand for phosphors containing an element other than a rare earth element as a light-emitting element.

Of the phosphors containing an element other than a rare earth element as a light-emitting element, red phosphor 3.6 $MgO.4CaF_2$—$GeO_2$:0.01 Mn containing $Mn^{4+}$ as a light-emitting element is known as an oxide-based material with excellent stability (e.g., Patent Literature 4). Another oxide-based material known as having excellent stability is green phosphor $ZnGa_2O_4$:Mn containing $Mn^{2+}$ as a light-emitting element (e.g., Patent Literature 5). ZnO having an oxygen defect as a luminescence center is known (e.g., Patent Literature 6) as a green or blue phosphor. Moreover, faujasite zeolites containing Ag ions are known to become phosphors ranging from orange to green (e.g., Patent Literature 7).

It has been reported that phosphors obtained by adding titanium to a high-purity zirconium oxide exhibit bluish white fluorescence under excitation of ultraviolet light (Non-Patent Literature 1 to 3).

However, there have been few studies on attempts to achieve fluorescence by adding a small amount of an element other than a rare earth element to zirconium oxide, and high fluorescence characteristics have yet to be achieved.

CITATION LIST

Patent Literature

Patent Literature 1: JP2000-516296A
Patent Literature 2: JP2005-048107A
Patent Literature 3: JP2008-069290A
Patent Literature 4: JP2008-202044A
Patent Literature 5: JP2000-080363A
Patent Literature 6: JP2006-233047A
Patent Literature 7: JP2012-052102A

Non-Patent Literature

Non-Patent Literature 1: T. Shimizu et al., Journal of Japan Society of Powder and Powder Metallurgy vol. 46, No. 2 (1999) 175-179

Non-Patent Literature 2: M. Akiyama et al., Appl. Phys. Lett. 81 (2002) 457

Non-Patent Literature 3: Y. Cong et al., Journal of Luminescence 126 (2007) 822-826

SUMMARY OF INVENTION

Technical Problem $GeO_2$ and $Ga_2O_3$ are respectively the major components of $3.6MgO.4CaF_2.GeO_2$:0.01Mn and $ZnGa_2O_4$:Mn, mentioned above. Both are limited in their reserve amounts, as rare earth elements, and also very expensive materials. Ag in Ag-containing zeolites is also an expensive material. Moreover, $3.6MgO.4CaF_2.GeO_2$:0.01Mn, $ZnGa_2O_4$:Mn, ZnO, Ag-containing zeolite phosphors, and titanium addition zirconium oxide all have luminance levels lower than phosphors comprising a rare earth element as a light-emitting element. Thus, there has been demand for development of inexpensive oxide-based phosphors with high luminous efficacy.

An object of the present invention is to provide an oxide-based phosphor comprising elements other than rare earth elements as light-emitting elements with low material costs, while achieving high luminous efficacy. An object of the present invention is also to provide a method for producing the phosphor.

Solution to Problem

The present inventors conducted extensive research to achieve the above objects and found that an oxide-based phosphor (fluorescent material) containing specific elements other than rare earth elements can achieve the above objects. Consequently, the present inventors completed the present invention.

Specifically, the present invention relates to the following phosphor, method for producing the phosphor, use of a material as a phosphor, and method for using a material as a phosphor.

Item 1. A phosphor comprising the following (1) to (3):
  (1) zirconium oxide,
  (2) titanium, and
  (3) at least one element selected from the group consisting of phosphorus, selenium, boron, and silicon.

Item 2. The phosphor according to Item 1, which upon excitation by ultraviolet light at a wavelength of 300 nm or less, exhibits fluorescence at a wavelength of 400 nm to 600 nm.

Item 3. The phosphor according to Item 1 or 2, wherein the content of (3) the at least one element selected from the group consisting of phosphorus, selenium, boron, and silicon is 0.001 to 5.0 wt %.

Item 4. The phosphor according to any one of Items 1 to 3, wherein the content of (2) the titanium is 0.05 to 0.8 wt %.

Item 5. A method for producing the phosphor according to any one of Items 1 to 4, the method comprising in sequence the following steps 1 to 3:
  step 1 of adding, to a zirconium compound slurry, a titanium compound and a compound comprising at least one element selected from the group consisting of phosphorus, selenium, boron, and silicon;
  step 2 of neutralizing the slurry obtained in step 1 to thereby obtain a zirconium-based hydroxide; and
  step 3 of heating the zirconium-based hydroxide obtained in step 2 at 1,200° C. to 1,600° C.

Item 6. Use of a material as a phosphor, the material comprising the following (1) to (3):
(1) zirconium oxide,
(2) titanium, and
(3) at least one element selected from the group consisting of phosphorus, selenium, boron, and silicon.

Item 7. A method for using a material as a phosphor, the material comprising the following (1) to (3):
(1) zirconium oxide,
(2) titanium, and
(3) at least one element selected from the group consisting of phosphorus, selenium, boron, and silicon.

Advantageous Effects of Invention

A zirconium oxide-based phosphor comprising zirconium oxide, titanium, and at least one element selected from the group consisting of phosphorus, selenium, boron and silicon according to the present invention is a material comprising no rare earth elements, and thus the phosphor can be produced at lower costs. Because this zirconium oxide-based phosphor can highly efficiently achieve wavelength conversion from light in the ultraviolet region to light in the visible light region, the zirconium oxide-based phosphor can be suitably used in this technical field.

DESCRIPTION OF EMBODIMENTS

The following describes the phosphor and the method for producing the phosphor according to the present invention in detail.

1. Phosphor of the Present Invention

The phosphor according to the present invention is a zirconium oxide-based phosphor comprising (1) zirconium oxide, (2) titanium, and (3) at least one element selected from the group consisting of phosphorus, selenium, boron, and silicon. The zirconium oxide-based phosphor that has this feature is a material that comprises no rare earth elements, and thus the phosphor can be produced at lower costs. Because this zirconium oxide-based phosphor can highly efficiency achieve wavelength conversion from light in the ultraviolet region to light in the visible light region, the zirconium oxide-based phosphor can be suitably used in this technical filed.

When excited by ultraviolet light at a wavelength of 300 nm or less (preferably 270 nm to 290 nm), the phosphor of the present invention exhibits fluorescence with a wavelength interval of 400 (nm) to 600 (nm), showing the peak near 470 to 490 (nm).

The content of (1) zirconium oxide in the phosphor of the present invention is preferably 92 to 98.8 wt %, and more preferably 97 to 98.5 wt %.

The content of (2) titanium (Ti) in the phosphor of the present invention is preferably 0.05 to 0.8 wt %, more preferably 0.08 to 0.3 wt %, and even more preferably 0.1 to 0.2 wt %. When titanium (the element titanium) is contained in these numerical amount ranges, anion lattice defects (F-center) are sufficiently formed in crystals without affecting concentration quenching. A phosphor with higher fluorescence intensity thus can be obtained.

The content of (3) at least one element selected from the group consisting of phosphorus (P), selenium (Se), boron (B), and silicon (Si) (or, simply, "element (3)") in the phosphor of the present invention is preferably 0.001 to 5.0 wt %, and more preferably 0.05 to 0.7 wt %. When element (3) is contained in these numerical amount ranges, a phosphor with higher fluorescence intensity can be produced without affecting concentration quenching. "Concentration quenching" refers to the following phenomenon: the interionic distance decreases as the concentration of the light-emitting ion increases, and the excitation energy migration between the ions before light emission such that the excitation energy is captured by impurities or lattice defects, thereby resulting in lowered fluorescence intensity. Element (3) can be contained singly or in a combination of two or more types of elements.

When only one type of element (3) is contained, the phosphorus content is more preferably 0.2 to 0.5 wt %, the selenium content is more preferably 0.1 to 0.3 wt %, the boron content is more preferably 0.07 to 0.13 wt %, and the silicon content is more preferably 0.07 to 0.13 wt %.

The advantageous effect of the present invention is most produced when the (2) titanium content is 0.1 to 0.2 wt % and the (3) phosphorus content is 0.2 to 0.5 wt %.

The phosphor of the present invention comprises the element zirconium, element titanium, element (3), and element oxygen (atoms) as essential elements, and may optionally comprise other elements (atoms) (i.e., impurity elements). Examples of impurity elements (atoms) include the element hafnium. The scope of the phosphor of the present invention encompasses zirconium oxide-based phosphors containing the impurity element. When the phosphor of the present invention comprises the element hafnium, the hafnium content is about 2.2 wt % or less. When the phosphor of the present invention comprises an impurity element other than the element hafnium, the content of the impurity element is desirably equal to or less than the titanium content and also equal to or less than the element (3) content.

As described above, a feature of the present invention is that the phosphor of the present invention comprises (1) zirconium oxide, (2) titanium, and (3) at least one element selected from the group consisting of phosphorus, selenium, boron, and silicon, and the scope of the phosphor of the present invention encompasses both of the following phosphors 1 and 2:

1. A phosphor consisting of the element zirconium, element titanium, element (3), and element oxygen; and
2. A phosphor consisting of the element zirconium, element titanium, element (3), element oxygen, and an impurity element.

2. Method for Producing the Phosphor of the Present Invention

The method for producing the phosphor of the present invention is not limited as long as the phosphor of the present invention is obtained. However, the phosphor is preferably produced by the following production method. Specifically, the phosphor is preferably produced by the method comprising in series the following steps (i) to (iii):
(i) step 1 of adding, to a zirconium compound slurry, a titanium compound and a compound comprising at least one element selected from the group consisting of phosphorus, selenium, boron, and silicon;
(ii) step 2 of neutralizing the slurry obtained in step 1 to obtain a zirconium-based hydroxide; and
(iii) step 3 of heating the zirconium-based hydroxide obtained in step 2 at 1,200° C. to 1,600° C.

The following describes each step in detail.

Step 1

In step 1, (2)' a titanium compound and (3)' a compound comprising at least one element selected from the group consisting of phosphorus, selenium, boron, and silicon are added to (1)' a zirconium compound slurry to thereby obtain a slurry containing the zirconium compound, the titanium compound, and the compound comprising at least one element selected from the group consisting of phosphorus, selenium, boron, and silicon.

(1)' Zirconium Compound Slurry

The zirconium compound slurry is not particularly limited as long as the slurry contains a zirconium compound. Examples include basic zirconium sulfate slurry and zirconium hydroxide slurry. The zirconium compound slurry can be used singly or in a combination of two or more.

The basic zirconium sulfate slurry is obtained, for example, by generating a zirconium-based precipitate from a zirconium salt solution. A zirconium salt solution obtained by dissolving a zirconium material in a solvent can be used.

The zirconium material is not particularly limited as long as the material can supply zirconium ions. Examples include zirconium inorganic acid salts such as zirconium oxynitrate and zirconium oxychloride, and zirconium organic acid salts such as zirconium tetrabutoxide. The zirconium materials can be used singly or in a combination of two or more.

The solvent used for preparing a zirconium salt solution is not particularly limited as long as the solvent can dissolve a zirconium material. Examples include aqueous solvents such as water, and organic solvents such as methanol and ethanol. The solvents can be used singly or in a combination of two or more.

The following are specific examples of the combination of a zirconium material and a solvent. When an aqueous solvent such as water is used as a solvent, zirconium inorganic acid salts such as zirconium oxynitrate and zirconium oxychloride can be used as a zirconium material. When organic solvents such as methanol and ethanol are used as a solvent, zirconium organic acid salts such as zirconium tetrabutoxide can be used as a zirconium material. From the standpoint of productivity on an industrial scale, and the like, the present invention preferably uses zirconium oxychloride with an aqueous solvent (particularly water).

The concentration of the zirconium salt solution is not particularly limited, and can suitably be determined in accordance with the type of the salt for use (solubility), and the like. Typically, the zirconium material is preferably present in an amount of about 5 to 200 g calculated as zirconium oxide ($ZrO_2$), and more preferably 10 to 100 g calculated as zirconium oxide ($ZrO_2$), in 1,000 g of the solvent.

Examples of methods for preparing a basic zirconium sulfate slurry by generating a zirconium-based precipitate include a method comprising mixing a zirconium salt solution with a reagent for synthesizing sulfate, and heating the mixture to 65° C. or more to less than 100° C. (preferably 70 to 98° C.); alternatively, a reagent for synthesizing sulfate may be added to a zirconium salt solution at 65° C. or more to less than 100° C. (preferably 70 to 98° C.).

Any reagent for synthesizing sulfate can be used as long as the reagent can react with zirconium ions to generate a sulfate (i.e., those capable of synthesizing sulfate), and examples include sodium sulfate and ammonium sulfate. The reagent for synthesizing sulfate can be in any form, for example, powder or solution.

The basic zirconium sulfate slurry may optionally be subjected to solid-liquid separation to obtain a basic zirconium sulfate, and the basic zirconium sulfate may be washed with water. The solid-liquid separation may be performed in accordance with a known method such as filtration, centrifugation, and decantation. The basic zirconium sulfate washed with water may be re-dispersed in a dispersion medium such as water to form a basic zirconium sulfate slurry.

The zirconium hydroxide slurry can be obtained by neutralizing the basic zirconium sulfate slurry with a base. The zirconium hydroxide slurry, as described above, can be used as a starting material of step 1. The base for neutralizing the basic zirconium sulfate slurry is not particularly limited. Examples of usable bases include ammonium hydroxide, ammonium bicarbonate, sodium hydroxide, and potassium hydroxide. The bases can be used singly or in a combination of two or more.

The amount of the base to be added is not particularly limited as long as a precipitate is generated from the solution. The base is typically added so that the zirconium compound slurry has a pH of 10 or more, and preferably 12 or more.

The zirconium hydroxide slurry may optionally be subjected to solid-liquid separation, and the obtained zirconium hydroxide may be washed with water. The solid-liquid separation method is the same as that used for the basic zirconium sulfate slurry. The zirconium hydroxide washed with water can be re-dispersed in a dispersion medium such as water to form a zirconium hydroxide slurry.

(2)' Titanium Compound

The titanium compound is not particularly limited as long as the compound can solvate or disperse in a solvent used for the zirconium compound slurry. Examples include inorganic titanium compounds such as titanium oxide and titanium tetrachloride, and titanium alcoholates such as tetramethyl titanate, tetraisopropyl titanate, and tetrabutyl titanate. The titanium compounds can be used singly or in a combination of two or more.

These titanium compounds for use can be produced in accordance with a known method, or commercially available. The titanium compound may contain nitrate, carbonate, sulfate, chloride, bromide, a powdery oxide, and the like. A liquid obtained by dissolving or dispersing a titanium compound in a solvent, such as water (titanium compound solution or dispersion) may be used.

(3)' Compound Comprising at Least One Element Selected from the Group Consisting of Phosphorus, Selenium, Boron, and Silicon The following describes the compound comprising at least one element selected from the group consisting of phosphorus, selenium, boron, and silicon (the compound comprising element (3)).

The phosphorus compound is not particularly limited as long as the compound can solvate or disperse in a solvent used for the zirconium compound slurry. Examples include phosphoric acid; alkali metal phosphates such as sodium phosphate monobasic, potassium phosphate monobasic, sodium phosphate dibasic, potassium phosphate dibasic, and sodium phosphate tribasic; ammonium phosphates such as diammonium hydrogen phosphate and ammonium dihydrogen phosphate; and polyphosphoric acid. The phosphorus compounds can be used singly or in a combination of two or more.

The selenium compound is not particularly limited as long as the compound can solvate or disperse in a solvent used for the zirconium compound slurry. Examples include selenous acid, selenic acid, selenium dioxide, selenium trioxide, and selenite (e.g., sodium selenite and potassium selenite). The selenium compounds can be used singly or in a combination of two or more.

The boron compound is not particularly limited as long as the compound can solvate or disperse in a solvent used for the zirconium compound slurry. Examples include boron, borate (e.g., sodium borate and potassium borate), boric acid, boron trioxide, boron trichloride, and ammonium borate. The boron compounds can be used singly or in a combination of two or more.

The silicon compound is not particularly limited as long as the compound can solvate or disperse in a solvent used for the zirconium compound slurry. Examples include silicon oxide, sodium silicate, sodium silicofluoride, hydrosilicofluoric acid, ammonium fluorosilicate, potassium fluorosilicate, and silicon tetrachloride. The silicon compounds can be used singly or in a combination of two or more.

The phosphorus compound, selenium compound, boron compound, and silicon compound (i.e., the compound comprising element (3)) for use can be produced in accordance with a known method or can be commercially available. The compounds comprising element (3) may optionally comprise sulfate, chloride, bromide, a powdery oxide, and the like. A liquid obtained by dissolving or dispersing the compound comprising element (3) in a solvent such as water may be used.

Addition of Titanium Compound and Compound Comprising Element (3)

The titanium compound and the compound comprising element (3) are added to the zirconium compound slurry. When the compounds are added, high dispersion should be ensured for example, by extending the addition time, as necessary. The preferable amount, the more preferable amount, and the even more preferable amount of the zirconium compound slurry, the titanium compound, and the compound comprising element (3) for use should be determined to match the preferable content, the more preferable content, and the even more preferable content of the (1) zirconium oxide, (2) titanium, and (3) the element as defined in section 1. Phosphor of the Present Invention.

Step 2

In step 2, the slurry obtained in step 1 is neutralized to generate a precipitate of zirconium-based hydroxide. Specifically, for neutralization, a base is added to the slurry obtained in step 1. An acid may optionally be added for neutralization.

The base for use in neutralization is not particularly limited. Examples of usable bases include ammonium hydroxide, ammonium bicarbonate, sodium hydroxide, and potassium hydroxide. The bases may be used singly or in a combination of two or more.

The amount of the base to be added is not particularly limited as long as a precipitate is generated from the slurry. The base is typically added so that the slurry has a pH of 9 or more, and preferably 12 or more.

The generated precipitate of zirconium-based hydroxide can be separated. The temperature of the slurry containing the precipitate is not particularly limited, and the separation can be performed when the slurry has a temperature near room temperature. However, the slurry may be heated to 60° C. or more as necessary, depending on, for example, the productivity on an industrial scale.

Subsequently, the generated precipitate of zirconium-based hydroxide can be collected by using a solid-liquid separation method. This provides zirconium-based hydroxide, which is a precursor to the zirconium oxide-based phosphor. Examples of solid-liquid separation methods include the same method as used for the basic zirconium sulfate described in step 1. After the collection, the generated zirconium-based hydroxide may optionally be washed with water.

The obtained zirconium-based hydroxide may further optionally be dried. The drying may be performed in accordance with a known method. For example, either natural drying or heat drying can be used. After being dried, the zirconium-based hydroxide may optionally be subjected to pulverization, classification, and the like.

Step 3

Figure 8:
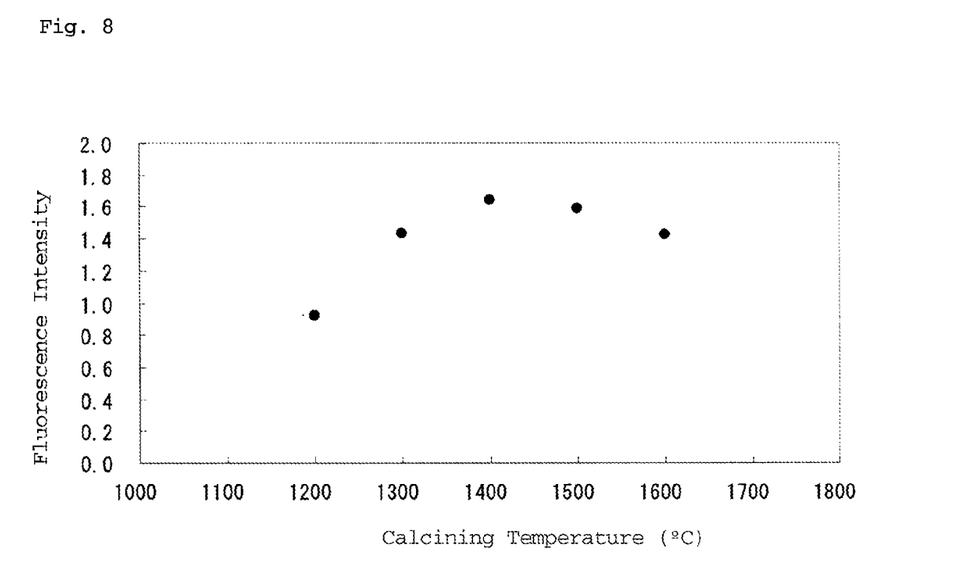
FIG. 8 shows a correlation between the calcining temperature and the fluorescence intensity of each of the zirconium oxide-based phosphors obtained in Examples 6, and 28 to 31.

In step 3, the zirconium-based hydroxide obtained in step 2 is heated at 1,200° C. to 1,600° C., thereby providing the phosphor of the present invention. Any heating temperature is applicable as long as titanium and element (3) can form an anion defect lattice in zirconium oxide; however, the temperature is typically about 1,200 to 1,600° C., and preferably 1,300 to 1,500° C. An anion defect lattice is efficiently formed within the temperature ranges. Table 1 and FIG. 8 show the results of the test concerning the correlation between the calcining temperature and the fluorescence intensity. The heating atmosphere may be an air atmosphere or oxidizing atmosphere. After the heating, the phosphor may optionally be subjected to pulverization, classification, and the like. Although not particularly limited, the pulverization may be performed with a pulverizer, such as planetary mill, ball mill, or jet mill.

EXAMPLES

The Examples and Comparative Examples described below further clarify the feature of the present invention. The present invention is not limited to the embodiments of these Examples.

The relative fluorescence intensity values in Examples and Comparative Examples were measured with a spectrofluorometer (FP-6500 spectro fluorometer) manufactured by JASCO Corporation. The wavelength of ultraviolet light (excitation light) was 280 (nm).

Example 1

Zirconium oxychloride was weighed to give 20 g on a zirconium oxide basis, and dissolved in ion-exchanged water to prepare 500 g of a solution.

Powdery sodium sulfate was added to the solution, and the mixture was heated to 98° C. to thereby obtain a slurry of basic zirconium sulfate. The slurry was subjected to solid-liquid separation, and the solids of the obtained basic zirconium sulfate were washed with ion-exchanged water. The basic zirconium sulfate washed with water was re-dispersed in ion-exchanged water, and the impurities were removed, thereby giving a basic zirconium sulfate slurry (the concentration of the basic zirconium sulfate: 10 wt % on a zirconium oxide basis).

A phosphoric acid solution was added to the slurry to give a concentration of 0.001 wt % on a phosphorus basis relative to the total amount of the zirconium oxide-based powder to be finally obtained. Further, a titanium tetrachloride solution was added to give a concentration of 0.10 wt % on a titanium basis relative to the total amount of the zirconium oxide-based powder to be finally obtained. Subsequently, an ammonium hydroxide solution was added to the slurry to adjust the pH of the slurry to 9.3. The slurry was subjected to solid-liquid separation to collect zirconium-based hydroxide, followed by washing with ion-exchanged water. The zirconium-based hydroxide was then calcined at 1,400° C. for 2 hours, thereby giving a zirconium oxide-based powder of Example 1 according to the present invention.

Examples 2 to 27 and 32

The procedure of Example 1 was repeated except that (a) the type of element (3), (b) the content of element (3), and (c) the content of titanium were changed as shown in Table 1, thereby giving zirconium oxide-based powders of Examples 2 to 27 and 32.

As materials of element (3) (or, "material (3)"), the following products were used.
Material (3)
Material of Phosphorus: Phosphoric Acid Solution (Phosphoric Acid: Wako Pure Chemical Industries, Ltd. Extra Pure Grade)
Material of Selenium: Selenic Acid Solution (Selenic Acid: Wako Pure Chemical Industries, Ltd. Extra Pure Grade)
Material of Boron: Sodium Borate Solution (Sodium Borate: Wako Pure Chemical Industries, Ltd. Extra Pure Grade)
Material of Silicon: Silicon Tetrachloride Solution (Silicon Tetrachloride: Wako Pure Chemical Industries, Ltd. Extra Pure Grade)

Examples 28 to 31

The procedure of Example 6 was repeated except that the calcining temperature was changed as shown in Table 1, thereby giving zirconium oxide-based powders of Examples 28 to 31.

Comparative Examples 1 to 16

The procedure of Example 1 was repeated except that the phosphoric acid solution was not added, and that the titanium tetrachloride solution was added to give the titanium content shown in Table 1 below, thereby giving zirconium oxide-based powders of Comparative Examples 1 to 10.

The procedure of Example 1 was repeated except that materials (comparative materials) for comparative elements (tin, germanium, tantalum, calcium, aluminum, and niobium) shown in Table 2 were added in an amount of 0.10 wt % on a comparative element basis, instead of the phosphoric acid solution, thereby giving zirconium oxide-based powders of Comparative Examples 11 to 16. The following materials are used as comparative materials.

Comparative Materials
Material of Tin: Tin Chloride Solution (Tin Chloride: Wako Pure Chemical Industries, Ltd., Analytical Grade)
Material of Germanium: Germanium Chloride Solution (Germanium Chloride: Wako Pure Chemical Industries, Ltd. Analytical Grade)
Material of Tantalum: Tantalum Chloride Solution (Tantalum Chloride: Wako Pure Chemical Industries, Ltd., No Grade)
Material of Calcium: Calcium Chloride Solution (Calcium Chloride: Wako Pure Chemical Industries, Ltd., Extra Pure Grade)
Material of Aluminum: Aluminum Chloride Solution (Aluminum Chloride: Wako Pure Chemical Industries, Ltd. Analytical Grade)
Material of Niobium: Niobium Chloride Solution (Niobium Chloride: Wako Pure Chemical Industries, Ltd., Extra Pure Grade)

The materials (3), the comparative materials, and the titanium tetrachloride solution used in Examples 1 to 32 and Comparative Examples 1 to 16 were each added to achieve the content of element (3), the content of the comparative elements, and the content of the titanium (wt %) shown in Tables 1 and 2 in the finally obtained zirconium oxide-based powders.

Evaluation: Measurement of Relative Fluorescence Intensity

The zirconium oxide-based powders obtained in Examples 1 to 32 and Comparative Examples 1 to 16 were milled to obtain zirconium oxide-based phosphors. Each of the phosphors was measured for relative fluorescence intensity. Table 1 shows the fluorescence wavelength and fluorescence intensity of the phosphors of Examples 1 to 32 and Comparative Examples 1 to 10. Table 2 shows the fluorescence wavelength and fluorescence intensity of the phosphors of Comparative Examples 11 to 16. The fluorescence wavelength refers to the wavelength of fluorescence spectrum peak.

Figure 1:
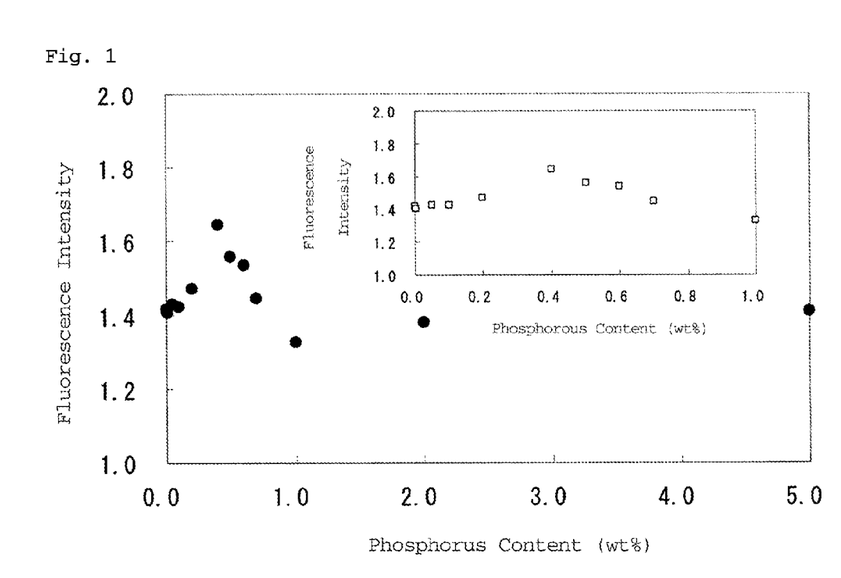
FIG. 1 shows a correlation between the phosphorus content and the fluorescence intensity of each of the zirconium oxide-based phosphors obtained in Examples 1 to 12.
Figure 2:
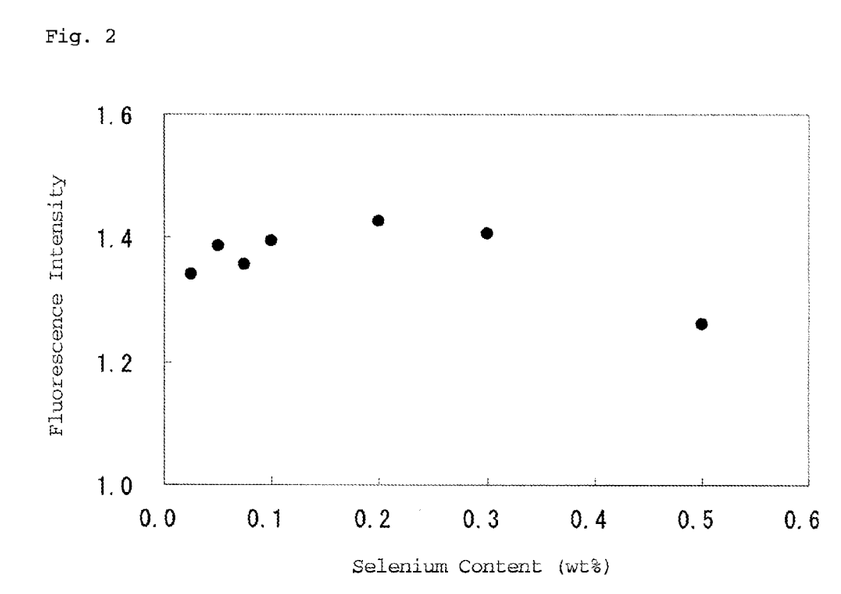
FIG. 2 shows a correlation between the selenium content and the fluorescence intensity of each of the zirconium oxide-based phosphors obtained in Examples 13 to 19.
Figure 3:
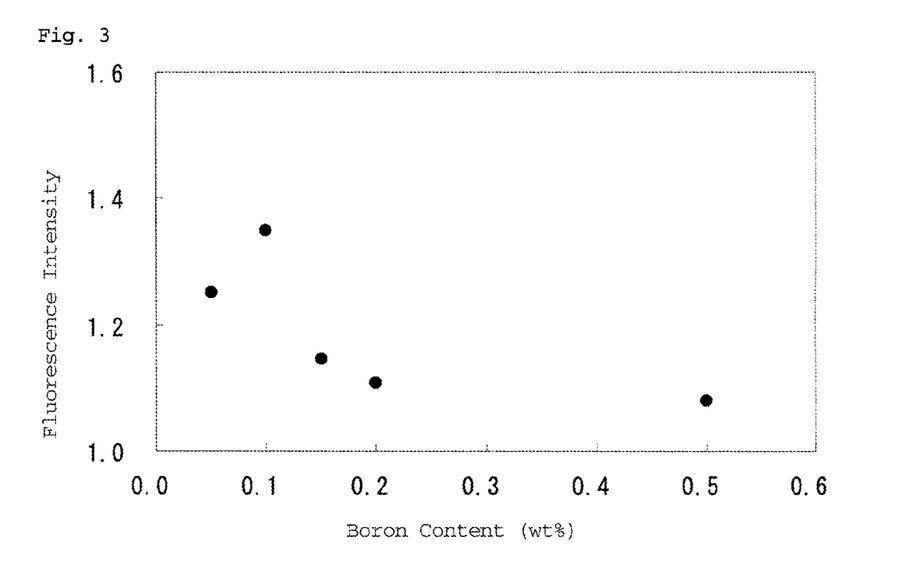
FIG. 3 shows a correlation between the boron content and the fluorescence intensity of each of the zirconium oxide-based phosphors obtained in Examples 20 to 24.
Figure 4:
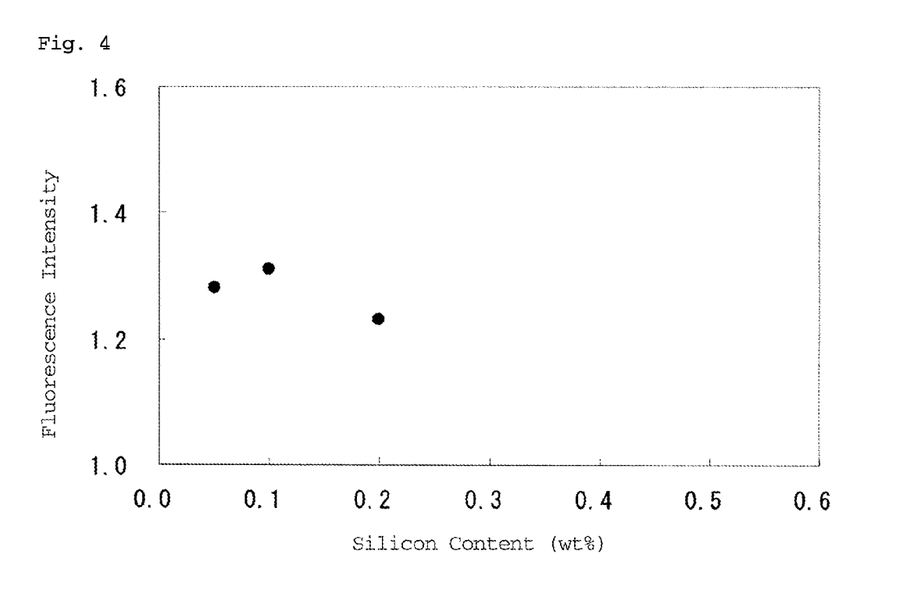
FIG. 4 shows a correlation between the silicon content and the fluorescence intensity of each of the zirconium oxide-based phosphors obtained in Examples 25 to 27.
Figure 5:
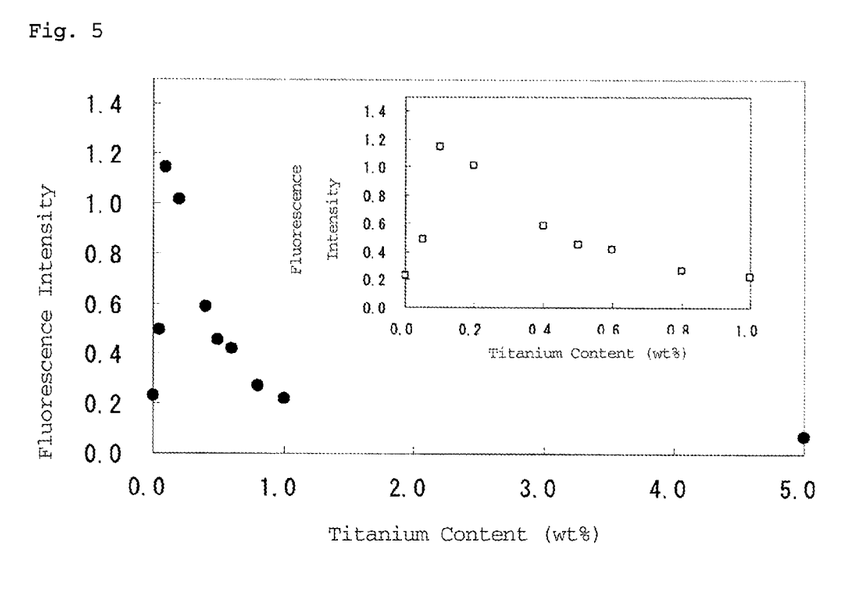
FIG. 5 shows a correlation between the titanium content and the fluorescence intensity of each of the zirconium oxide-based phosphors obtained in Comparative Examples 1 to 10.
Figure 6:
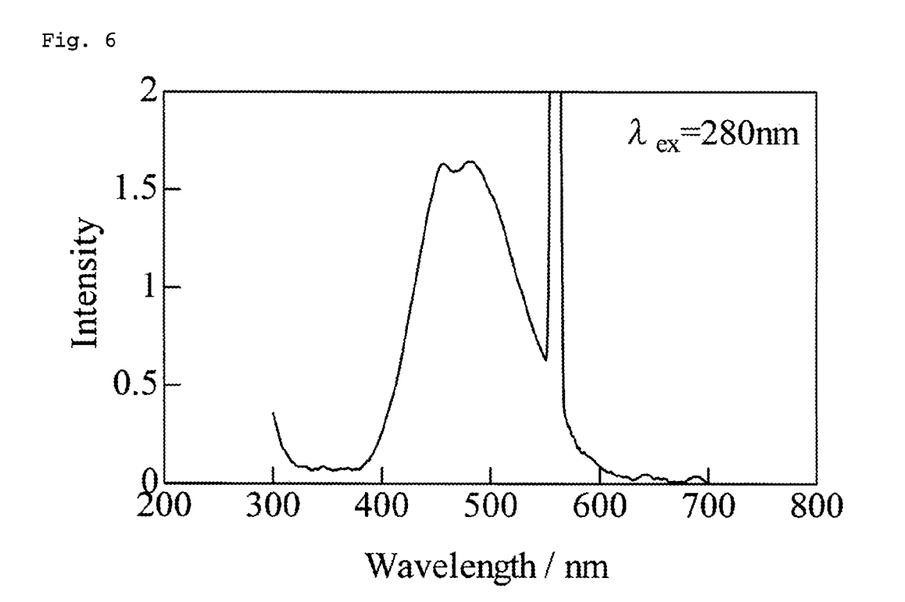
FIG. 6 shows a fluorescence spectrum of the zirconium oxide-based phosphor obtained in Example 6.
Figure 7:
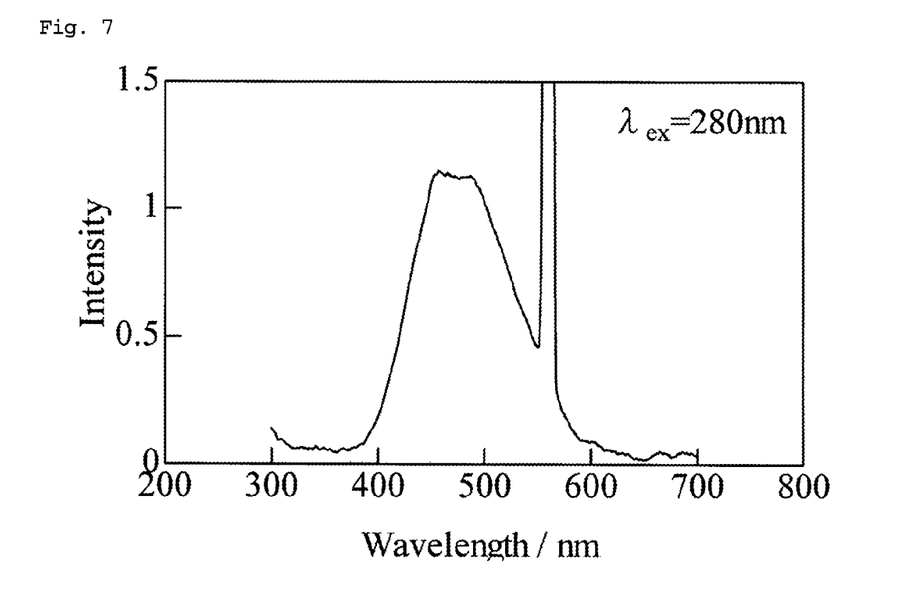
FIG. 7 shows a fluorescence spectrum of the zirconium oxide-based phosphor obtained in Comparative Example 3.

FIG. 1 shows the correlation between the phosphorus content and the fluorescence intensity of the phosphors of Examples 1 to 12. FIG. 2 shows the correlation between the selenium content and the fluorescence intensity of the phosphors of Examples 13 to 19. FIG. 3 shows the correlation between the boron content and the fluorescence intensity of the phosphors of Examples 20 to 24. FIG. 4 shows the correlation between the silicon content and the fluorescence intensity of the phosphors of Examples 25 to 27. FIG. 5 shows the correlation between the titanium content and the fluorescence intensity of the phosphors of Comparative Examples 1 to 10. FIG. 6 shows the fluorescence spectrum of the zirconium oxide-based phosphor obtained in Example 6. FIG. 7 shows the fluorescence spectrum of the zirconium oxide-based phosphor obtained in Comparative Example 3. FIG. 8 shows the correlation between the calcining temperature and the fluorescence intensity of the phosphors of Examples 6 and 28 to 31.

TABLE 1

| | Element (3) | Content of Element (3) (wt %) | Content of Titanium (wt %) | Calcining Temperature (° C.) | Fluorescence Wavelength (nm) | Fluorescence Intensity |
|---|---|---|---|---|---|---|
| Example 1 | Phosphorus | 0.001 | 0.10 | 1400 | 474.0 | 1.41436 |
| Example 2 | | 0.005 | | 1400 | 480.0 | 1.40481 |
| Example 3 | | 0.05 | | 1400 | 476.5 | 1.42720 |
| Example 4 | | 0.10 | | 1400 | 479.5 | 1.42185 |
| Example 5 | | 0.20 | | 1400 | 480.0 | 1.47031 |
| Example 6 | | 0.40 | | 1400 | 479.5 | 1.64415 |
| Example 7 | | 0.50 | | 1400 | 471.0 | 1.55977 |
| Example 8 | | 0.60 | | 1400 | 482.0 | 1.53459 |
| Example 9 | | 0.70 | | 1400 | 472.5 | 1.44635 |
| Example 10 | | 1.0 | | 1400 | 473.5 | 1.32641 |
| Example 11 | | 2.0 | | 1400 | 473.5 | 1.37938 |
| Example 12 | | 5.0 | | 1400 | 479.5 | 1.40883 |
| Example 13 | Selenium | 0.025 | | 1400 | 471.5 | 1.34022 |
| Example 14 | | 0.050 | | 1400 | 467.5 | 1.38585 |
| Example 15 | | 0.075 | | 1400 | 470.5 | 1.35728 |
| Example 16 | | 0.10 | | 1400 | 470.0 | 1.39373 |
| Example 17 | | 0.20 | | 1400 | 473.0 | 1.42615 |
| Example 18 | | 0.30 | | 1400 | 475.0 | 1.40596 |
| Example 19 | | 0.50 | | 1400 | 462.5 | 1.26143 |
| Example 20 | Boron | 0.05 | | 1400 | 471.0 | 1.25213 |
| Example 21 | | 0.10 | | 1400 | 468.0 | 1.34952 |
| Example 22 | | 0.15 | | 1400 | 470.0 | 1.14459 |
| Example 23 | | 0.20 | | 1400 | 470.5 | 1.10737 |
| Example 24 | | 0.50 | | 1400 | 475.5 | 1.07908 |
| Example 25 | Silicon | 0.05 | | 1400 | 474.0 | 1.28202 |
| Example 26 | | 0.10 | | 1400 | 469.0 | 1.31052 |
| Example 27 | | 0.20 | | 1400 | 472.0 | 1.23149 |
| Example 28 | Phosphorus | 0.40 | | 1200 | 471.5 | 0.92044 |
| Example 29 | | | | 1300 | 466.5 | 1.43391 |
| Example 6 | | | | 1400 | 479.5 | 1.64415 |
| Example 30 | | | | 1500 | 474.5 | 1.58814 |
| Example 31 | | | | 1600 | 473.5 | 1.42879 |
| Example 32 | Phosphorus Silicon | 0.20 0.10 | | 1400 | 472.0 | 1.3208 |
| Comp. Ex. 1 | — | | 0.00 | 1400 | 461.0 | 0.22940 |
| Comp. Ex. 2 | | | 0.05 | 1400 | 453.5 | 0.49168 |
| Comp. Ex. 3 | | | 0.10 | 1400 | 457.5 | 1.14805 |
| Comp. Ex. 4 | | | 0.20 | 1400 | 479.5 | 1.01486 |
| Comp. Ex. 5 | | | 0.40 | 1400 | 481.5 | 0.58965 |
| Comp. Ex. 6 | | | 0.50 | 1400 | 456.0 | 0.45117 |
| Comp. Ex. 7 | | | 0.60 | 1400 | 453.0 | 0.41801 |
| Comp. Ex. 8 | | | 0.80 | 1400 | 458.5 | 0.26738 |
| Comp. Ex. 9 | | | 1.0 | 1400 | 486.0 | 0.22101 |
| Comp. Ex. 10 | | | 5.0 | 1400 | 520.0 | 0.07047 |

TABLE 2

| | Comparative Element | Content of Comparative Element (wt %) | Content of Titanium (wt %) | Calcining Temperature (° C.) | Fluorescence Wavelength (nm) | Fluorescence Intensity |
|---|---|---|---|---|---|---|
| Comp. Ex. 11 | Tin | 0.10 | 0.10 | 1400 | 489.0 | 1.09714 |
| Comp. Ex. 12 | Germanium | | | 1400 | 479.0 | 1.07353 |
| Comp. Ex. 13 | Tantalum | | | 1400 | 484.5 | 0.88845 |
| Comp. Ex. 14 | Calcium | | | 1400 | 481.0 | 0.73967 |
| Comp. Ex. 15 | Aluminum | | | 1400 | 478.5 | 0.70156 |
| Comp. Ex. 16 | Niobium | | | 1400 | 472.5 | 0.28053 |

Among the zirconium oxide-based phosphors of Comparative Examples 2 to 10, which contain only titanium, the phosphor with the titanium content of 0.1 wt % (Comparative Examples 3) achieved the highest value of the fluorescence intensity, and the value was merely 1.14805. Among Comparative Examples 11 to 16, the phosphor containing tin (Comparative Example 11), which even showed the highest value of fluorescence intensity, merely achieved 1.09714. The zirconium oxide-based phosphor of Comparative Example 1 to which titanium and element (3) were not added had a low fluorescence intensity of 0.22940. In contrast with these Comparative Examples, among zirconium oxide-based phosphors of Examples 1 to 12, the phosphor with the phosphorus content of 0.4 wt % and the titanium content of 0.1 wt % (Example 6) achieved the highest value of fluorescence intensity, with the value as high as 1.64415. Zirconium oxide of course cannot achieve sufficient fluorescence intensity, and even zirconium oxide-based phosphors containing only titanium as an additive element cannot achieve sufficient fluorescence intensity. However, the results revealed that a zirconium oxide-based phosphor containing phosphorus and titanium as additive elements can achieve high fluorescence intensity.

The highest value of fluorescence intensity of the zirconium oxide-based phosphors comprising selenium, boron, or silicon in combination with titanium (Examples 13 to 27) is as follows (by element): 1.42615 when selenium was contained (Example 17), 1.34952 when boron was contained (Example 21), and 1.31052 when silicon was contained (Example 26). The results revealed that a zirconium oxide-based phosphor containing selenium, boron, or silicon, in combination with titanium can achieve high fluorescence intensity as with the zirconium oxide-based phosphor containing phosphorus and titanium.

INDUSTRIAL APPLICABILITY

The zirconium oxide-based phosphor comprising titanium and at least one element selected from the group consisting of phosphorus, selenium, boron, and silicon according to the present invention is a material that comprises no rare earth elements, can be produced at lower costs, and can increase supply stability. The zirconium oxide-based phosphor can highly efficiently achieve wavelength conversion from the light in the ultraviolet region to the light in the visible light region, and can be used in wavelength conversion layers for increasing the efficiency of silicon-based photovoltaic power generation, LEDs, electronic microscopes, X-ray photography, and signs. The phosphor according to the present invention can be used in combination with plasma displays using ultraviolet light as an excitation source, and phosphors that can convert near-ultraviolet light to visible light of, for example, fluorescent lamps using noble gas instead of mercury.

The invention claimed is:
1. A phosphor comprising the following (1) to (3):
   (1) zirconium oxide,
   (2) titanium, and
   (3) at least one element selected from the group consisting of phosphorus, selenium, boron, and silicon.
2. The phosphor according to claim 1, which upon excitation by ultraviolet light at a wavelength of 300 nm or less, exhibits fluorescence at a wavelength of 400 nm to 600 nm.
3. The phosphor according to claim 1, wherein (3) the content of the at least one element selected from the group consisting of phosphorus, selenium, boron, and silicon is 0.001 to 5.0 wt %.
4. The phosphor according to claim 1, wherein the content of (2) the titanium is 0.05 to 0.8 wt %.
5. A method for producing the phosphor according to claim 1, the method comprising in sequence the following steps 1 to 3:
   step 1 of adding, to a zirconium compound slurry, a titanium compound and a compound comprising at least one element selected from the group consisting of phosphorus, selenium, boron, and silicon;
   step 2 of neutralizing the slurry obtained in step 1 to thereby obtain a zirconium-based hydroxide; and
   step 3 of heating the zirconium-based hydroxide obtained in step 2 at 1,200° C. to 1,600° C.

* * * * *